(12) United States Patent
Beebe

(10) Patent No.: US 8,555,114 B2
(45) Date of Patent: Oct. 8, 2013

(54) DIAGNOSTICS METHODS FOR A COMMUNICATIONS DEVICE

(75) Inventor: Simon Beebe, Groton, MA (US)

(73) Assignee: Aastra Technologies Limited, Concord (CA)

( * ) Notice: Subject to any disclaimer, the term of this patent is extended or adjusted under 35 U.S.C. 154(b) by 379 days.

(21) Appl. No.: 12/878,845

(22) Filed: Sep. 9, 2010

(65) Prior Publication Data

US 2011/0060948 A1 Mar. 10, 2011

Related U.S. Application Data

(60) Provisional application No. 61/240,832, filed on Sep. 9, 2009.

(51) Int. Cl.
*G06F 11/00* (2006.01)

(52) U.S. Cl.
USPC .......................... 714/37; 714/47.1; 714/47.2

(58) Field of Classification Search
USPC ................ 714/25, 37, 38.1, 38.14, 45, 47.1, 714/47.2, 47.3
See application file for complete search history.

(56) References Cited

U.S. PATENT DOCUMENTS

| | | | |
|---|---|---|---|
| 2008/0162994 A1* | 7/2008 | Szucs et al. | 714/25 |
| 2008/0263398 A1* | 10/2008 | Mori et al. | 714/25 |
| 2008/0274716 A1* | 11/2008 | Fok et al. | 455/410 |
| 2009/0106605 A1* | 4/2009 | Kuchibhotla et al. | 714/47 |

* cited by examiner

*Primary Examiner* — Joseph D Manoskey

(57) ABSTRACT

A method facilitating the support of a communications device via diagnostic tools on the communications device and a remote computing device of monitoring predefined data elements associated with the operation of said communications device.

14 Claims, 2 Drawing Sheets

DIAGNOSTICS METHODS FOR A COMMUNICATIONS DEVICE

CROSS-REFERENCE TO RELATED APPLICATIONS

This application claims the benefit of priority to U.S. Provisional Application Ser. No. 61/240,832, filed 9 Sep., 2009.

BACKGROUND OF THE INVENTION

1. Field of the Invention

The present invention relates to digital networks, and more particularly, it relates to a system and method for providing diagnostics and troubleshooting tools for a communications device.

2. Description of the Related Art

IP Telephony (VoIP) is a converged voice/data technology that uses the data networks to carry voice (telephone) traffic, and is rapidly revolutionizing the world of enterprise communications. Some benefits of IP telephony include the ability to manage individual phone systems, access to a plethora of features and applications, improved reliability, improved performance, substantial cost savings and unified messaging.

Typically, SIP phones have a variety of features and functionalities that can be used for support and troubleshooting. Similarly call server partners (hosted and CPE based) combine their own capabilities with those of the phones to facilitate troubleshooting and support. Various tools, such syslog, variable levels of logging, RTCP-XR call statistics, error messages menu on the Telephone User Interface (TUI), are currently used to help with troubleshooting and support. The tools generally capture data to assist in the understanding of events or debugging actions or events, such as, capturing WIRESHARK® traces, retrieving config files, turning syslog on. However, VOIP solutions can be complex, making troubleshooting field issues more difficult with current capabilities. Oftentimes, syslog data does not provide sufficient data to effect a thorough diagnosis of a problem, which can greatly impact the problem resolution times. Prior art systems may also include numerous modules that produce logs, with each module having a plethora of logging levels, but with limited logging options for live environments. As such, relying solely on these reactive prior art troubleshooting methods leads to prolonged service interruptions for end users, and also places a considerable burden on the end users It is thus an object of the present invention to mitigate or obviate at least one of the above-mentioned disadvantages.

SUMMARY OF THE INVENTION

In another of its aspects, the present invention comprises a method for providing diagnostics and troubleshooting tools for a communications device, the method comprising the steps of:
  defining data elements to be monitored, the data elements being associated with the operation of the communications device,
  setting thresholds associated to the data elements, the thresholds corresponding to the normal operation of the communications device,
  capturing diagnostics data related to the data elements to determine the operational status of the communications device,
  capturing abnormal events data outside the thresholds,
  capturing contemporaneous fault events data,
  storing the captured data and events on a computer readable medium,
  programming the communications device to report the captured data and events to a remote computing device for fault analysis and resolution,
  whereby the remote computing device receives data related to the nature of the fault and the data leading up to the fault, the data being useful for efficient fault diagnosis and troubleshooting and timely resolution of the fault.

In another of its aspects, the present invention comprises a method for providing diagnostics and troubleshooting tools for a communications device, the method comprising the method comprising the steps of:
  defining data elements to be monitored, the data elements being associated with the operation of the communications device,
  associating the data elements with thresholds, the thresholds corresponding to the normal operation of the communications device,
  capturing diagnostics data related to the defined data elements to determine the operational status of the communications device,
  capturing abnormal events data outside the thresholds,
  capturing contemporaneous fault events data,
  storing the events data on a computer readable medium,
  programming a key on the communications device for activation by an end-user to transmit the events data and the contemporaneous fault events data to a remote computer for analysis,
  whereby the remote computing device receives data related to the nature of the fault and the data leading up to the fault, the data being useful for efficient fault diagnosis and troubleshooting and timely resolution of the fault.

In another of its aspects, the present invention provides a system for fault diagnosis of a communications device, the system comprising:
at least one diagnostic application program associated with said communications device;
a remote computing device configured to receive diagnostic data from said communications device for further analysis and diagnosis of the reported fault,
  said communications device comprising a computer readable medium comprising said least one diagnostic application program comprising a first program code for defining data elements to be monitored, said data elements being associated with the operation of said communications device, a second program code for defining setting thresholds associated to said data elements, wherein said thresholds corresponding to the normal operation of said communications device, a third program code for capturing diagnostics data related to said defined data elements to determine the operational status of said communications device, and for capturing abnormal events data outside said thresholds and capturing contemporaneous fault events data,
  a fourth program code comprising instructions to send said captured data and events to a predetermined remote computing device for fault analysis and resolution.

In another of its aspects, the present invention provides a method facilitating the support of a communications device via diagnostic tools associated with the communications device and a remote computer, such as a call server, a gateway or a switch. The remote computer is configured to receive data from the communications device for further analysis and diagnosis of the reported problem.

Advantageously, the application programs monitor the operational status of the communications device, and log a plurality of events, including thresholds associated with data elements, and transmit the log data including any contemporaneous or live fault events data to a remote computer for analysis, such that the remote computer receives data related to the nature of the fault and the data leading up to said fault, thus facilitating substantially faster diagnosis of the fault. The present invention provides for more proactive diagnostics which place less of a burden on the end users, by reporting call statistics for monitoring purposes, flagging excessive memory use on the communications device, and notification of network conditions. The diagnostic tests may be executed in live production environments, and provide memory/CPU load data, call state/msg sequences, which assist in the resolution of intermittent issues.

BRIEF DESCRIPTION OF THE DRAWINGS

Several preferred embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

Figure 1:
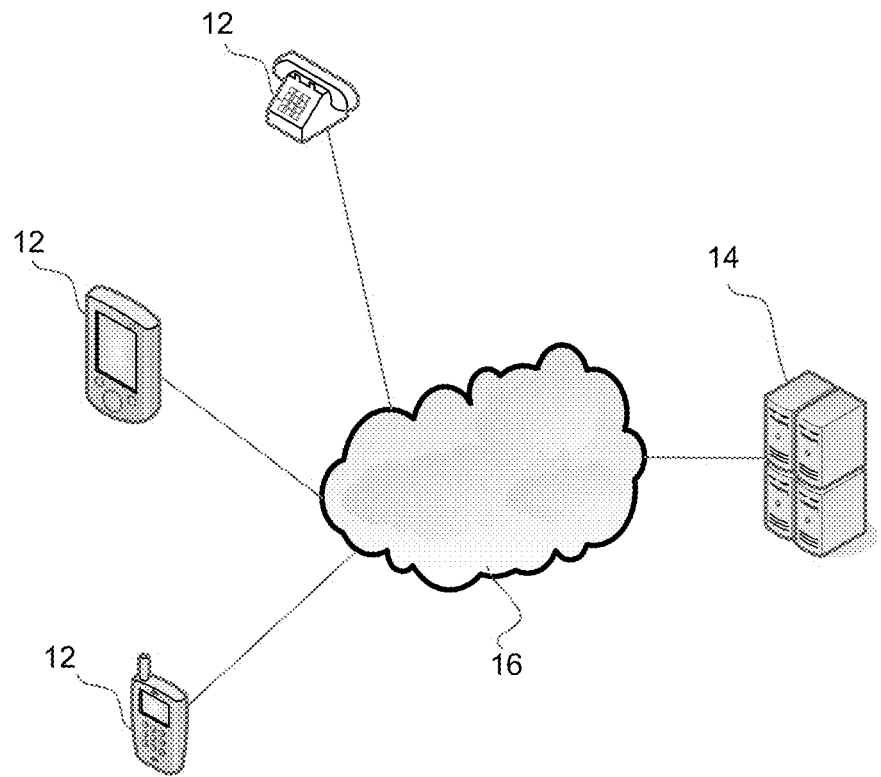
FIG. 1 depicts a communication system, in an exemplary embodiment.

FIG. 1 shows a system 10 for providing diagnostics and troubleshooting tools for a communications device 12. The communications device 12 is communicatively coupled to other network entities, such as a computing device 14 via a network 16, such as the Internet. The term "communicatively coupled" is used in its broadest sense to mean coupling in any fashion that allows information to be passed between the communications device 12, and other network devices within the network 16, such as the call server 14, or other servers, gateways, routers, switches, and so forth. Thus, for example, a communicatively coupled communications device 12 can be coupled either directly or indirectly via electromagnetic signals, such as electrically coupled, optically coupled, wirelessly coupled; and/or physically coupled.

An exemplary communications device 12 comprises a diagnostic module and tools which run hardware diagnostics to indicate any hardware and/or software issues. Such tools include, but are not limited to: ping, traceroute, syslog, call recorder (RTP stream), while diagnostic tests and/or data elements include: checking Rx/Tx paths and loop back port; checking connectivity to headset, consoles or identifying the hardware RMAs quickly.

Figure 2:
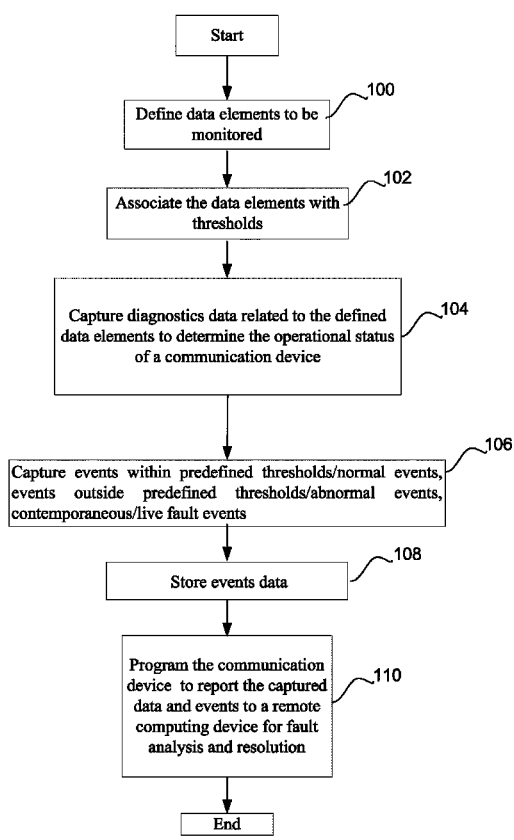
FIG. 2 shows a flowchart outlining exemplary steps in a method for diagnostics and support of a communications device.

FIG. 2 shows a flowchart outlining the method steps for providing diagnostics and troubleshooting tools for the communications device 12, the method comprises the steps of:

defining data elements to be monitored, the data elements being associated with the operation of the communications device 12, (step 100)

associating the data elements with thresholds, where the thresholds correspond to the normal operation of the communications device 12, (step 102)

capturing diagnostics data related to the defined data elements to determine the operational status of the communications device 12, (step 104)

capturing events data within predefined thresholds/normal events, events data outside predefined thresholds/abnormal events, contemporaneous/live fault events, (step 106)

storing the events data on a computer readable medium, (step 108)

programming the communications device 12 to report the captured data and events to a remote computing device 14 for fault analysis and resolution, (step 110)

such that the remote computing device 14 receives data related to the nature of the fault and the data leading up to the reported fault, which is useful for efficient fault diagnosis and troubleshooting and timely resolution of the reported fault.

The above method will now be described in detail. The execution of the hardware diagnostics or logging may be triggered automatically, by the end user, or by remote activation by a call server 14 or by support staff. For example, the above-noted tools may be configured to send results/data files to a specified destination, such as a remote computer, call server 14 or service provider. End user triggers involve the end user evoking support actions or capturing logs for an active call. Accordingly, the communications device 12 comprises a key or soft keys programmed to evoke specific diagnostic execution, or initiate automatic capture of support data, upon activation of the key, as will be described below. Additional, the end user may initiate logging via a support menu on the user interface (TUI) that provides multiple diagnostics and allow the user to capture SIP-related data or track memory usage, or evoke syslog. Advantageously, an end user may trigger the capture of data related to intermittent problems, which are otherwise substantially difficult to reproduce and/or capture diagnostics information. As part of the programming process, predefined "data elements" may be assigned to key or "Support Key", and upon activation (key press); the communications device 12 captures the defined elements and stores the data in a "support" file (similar to a crash file). As the file size may be limited due to memory constraints of the communications device 12, the support key may be used in conjunction with a circular event log as a data element. The circular event log records significant events in a data file for storage on the computer readable medium of the communications device 12, and this support file may be retrieved from the communications device 12, as needed. Effectively, the circular event log provides an easier means to obtain snapshot of status of the communications device 12, rather than enabling syslog. Typically, the file is limited in size, and so once the circular buffer style is full, the oldest logs are written over. By nature, this file contains historical data and when combined with a user initiated action ("support key"), captures events that precede an issue, thus providing the likely causes of the problem. Other exemplary data elements may include: short RTP recording, stack trace, memory status and line manager/SIP stack status. The support file may be automatically exported to a remote computer, call server 14 or service provider; alternatively the support file may be remotely retrieved from the remote computer, call server 14 or the service provider, as part of the action taken when the user presses the support key.

In more detail, the circular event log recording may be activated remotely or by a local admin, and runs in a production environment. The captured data may include significant status metrics, including other serious error conditions, such as: memory status (periodical, high and low stats); timeouts (DNS, Registration, SIP Proxy); module restarts; module critical errors; MOS score of previous calls; and error codes/log numbers (minimal size of data). The circular event log may also capture other events, such as, end user "support key" activation event or a SIP Notify message corresponding to an event change or changes to the communications device 12.

In another exemplary embodiment, remote logging activation may be initiated by the communications device 12 sending notification of a failed registration to the call server 14 or support staff. Generally, automated triggering may be result of an event related to any of the above-noted diagnostic tests being outside defined bounds or failing. For example, an automated trigger may occur in the event of a abnormal reboot (crash); a communications device 12 reboot, a registration failure, an authentication failure (Certificate/TLS, SIP account authentication, LLDP); failure to download config file or CSV; lack of response from another network entity (such as, a NTP server, a SIP proxy, a DNS server, or a DHCP server); approaching memory usage thresholds; low MOS scores (voice quality), invalid config parameter parsed, or other abnormal events. The call server 14 or support staff may turn the data capture on or off via SIP NOTIFY, an XML object or a config file, or turn on individual event triggers or groups of events triggers. The system 10 comprises a mechanism for remotely and locally transferring config files (server and local) from the communications device 12 together with other data files, such as a crash file or an event log. The user/admin of the communications device 12 provides a "PUSH" function, while the remote support staff have a "GET" capability. The activation method is firewall friendly, such as XML object in SIP NOTIFY. The mechanism may include a TUI and WebUI to export data files to a configured destination, via a defined transmission protocol. Additionally, the file name syntax may include the MAC address of the communications device 12 and time stamp, in order to avoid duplication from other devices 12.

In yet another exemplary embodiment, the communications device 12 automatically and independently pushes a data file once created, to a pre-configured destination via a pre-configured protocol. As stated above, the file may be a crash file or any data captured following activation of the "support key", and the file name syntax may include the MAC address of the communications device 12 and time stamp, in order to avoid duplication from other devices. The communications device 12 may also send notification that an event trigger has been evoked and that data has been captured. The communications device 12 may also include a TUI error menu for notification of errors/issues, such as registration, TLS, LLDP failures, or Web UI error menu, similar to the TUI, but with more information.

As stated above, following an event and logging data related to said event, the data may be stored in a file on the computer readable medium and/or may be transmitted automatically to a computer, call server or service provider. The file naming format may include the identity of the device and time and potentially type/content of data. In one exemplary situation, the data is uploaded automatically during idle cycles, as a background task. Additionally, the communications device 12 may be configured with a destination for data to be uploaded to, via XML, SIP NOTIFY, config files, and so forth, and the data may be sent via various protocols, such as, FTP or HTTP, as discussed previously. Given the possible constraints on memory capacity of the communications device 12, the data may be streamed to the remote computer, call server 14 or service provider when memory usage approaches predefined thresholds. Alternatively, a circular buffer may be used, as discussed above.

In another exemplary embodiment, the system 10 comprises syslog logging enhancements, in which the syslog capabilities are enhanced to produce a refined range of logging levels and updated format that targets a wider technical audience. The refined levels specifically target live production environments, and the format enables the partner support staff and/or the service provider to process logs and diagnose a wider range of issues without the need for further engineering processes or burden to the service provider. Advantageously, the enhanced format facilitates earlier qualification of issues, as opposed to prior art syslog output that is typically raw and cryptic and often only of value to engineering. The refined log data and format comprises more meaningful description and information, for example, info log; warning error log; critical error log; potentially add numbering and syntax to assist downstream parsing of syslog data by offboard application. The enhanced logs help guide support staff to specific focus areas, for example, network issues; configuration issues; call state issues; memory/CPU issues, and also help to initiate more appropriate data capture without having to refer back to engineering in a time consuming iterative process.

In another exemplary embodiment, the system 10 comprises additional event logs (based on refined format) for events that may assist in the diagnosis of issues. Although syslog is generally the fundamental vehicle to get additional information with respect to the communications device 12 operation, additional specific logs, such as, network timeouts; SIP error messaging; registration and authentication failures (with error codes); failure to download configuration files;

memory utilisation; call state errors; failover to backup proxy, assist in the diagnosis of issues.

In another exemplary embodiment, the system 10 comprises production syslog profiles having multiple sets of "logging profiles" that may be reliably run in production environments. These profiles assist in initial investigations when attempting to qualify problems. In addition, different problems require different logs, such as, voice path issues need RTP; line state issues need call state info; SIP signaling errors need SIP message trace. Thus, in this exemplary embodiment, multiple recommended logging profiles for live environment are defined and qualified, with each profile targeting more defined problem areas, for example, call state issues use a profile may capture output from various modules. In addition, high risk configurations may be identified, such as, a receptionist with 50 BLFs, 9 SCA lines; and corresponding testing of the various profiles and configurations is carried out in order to provide confidence for live production use.

In another exemplary embodiment, the system 10 comprises a method for periodically determining the memory utilization and a mechanism to record that information, and includes multiple levels of recording such that some data can be captured in a production environment. The recording of memory statistics is triggered based on a predefined threshold (for example, free memory less than critical operating level), including additional options to activate if the defined threshold is reached. However, the logging may also be activated via various mechanisms, such as the syslog mechanism, remote activation, or the end user. Once activated such statistics may be recorded at appropriate time intervals, and may be reset or configured to be cleared on reboots.

In yet another exemplary embodiment, the system 10 comprises a method for recording config file parsing errors and providing said parsing errors for all invalid or ignored configuration statements to the support staff or administrator for review. Typically, when parsing the config files all entries not successfully processed are ignored by the communications device 12. The mechanism for capture may be via syslog, or WebUI/TUI, and the error reporting may be categorized depending on the error, such as, configuration; network (LLDP, TLS certs, and so forth); SIP (registration failure and reason code), and so forth.

In yet another exemplary embodiment, the system 10 provides "boot-up" information to the admin user, and is available from the communications device 12 WebUI and/or TUI rather than only via syslog. The boot-up data may include data related to: IP configuration data (DHCP or static), DNS lookup data (was DNS lookup successful or is not being used), configuration files (which files were downloaded or not downloaded), SIP registration status, authentication status (LLDP, TLS; any timeouts or retries on server requests, such as DHCP/DNS/NTP); SIP trace (verbose, headers only); RTP packets (Rx/TX, Rx, Tx); WIRESHARK® information (after remote activation—without need for hub/PC/user involvement); memory usage; current syslog and level settings; crash log for abnormal reboots; register settings/stack trace; memory usage/free memory; CPU utilisation; local and server config files; and Config file parsing results (invalid parameters).

In another embodiment, the call server 14 platform includes a service provider "support" portal that acts as a recipient storage device for the communication data elements, as such is the destination point for files that can be manually or automatically uploaded from the devices 12. The platform incorporates a server for hosting a syslog application (as part of the solution provided to service providers).

The call server 14 platform also serves to initiate remote or support event triggers, such as allowing config files to be pulled from the communications device 12 remotely, pulling the circular event file and the crash file, or activating syslog via changing of the communications device 12 configuration. The call server 14 platform may also execute a log parser application that processes syslog files into more intelligible format; and may include a notification server for flagging events/data capture, and a server for recording call-related information for every single call through the call server 14, switch, or router, in order to facilitate faster problem diagnosis for timely resolutions.

The communications device 12 may be any IP device or endpoint (end node) for participating in a packet switched network, such as, but not limited to, IP phones, H.323 phones, DECT phones, SIP-DECT phones, ATAs, mobile phones, IPTVs, projectors, PDAs, digital cameras, PC, MP3 players, set-top boxes, game consoles, gateways, soft phones, firewalls, access-points, modems, network appliances, or any combination(s) thereof. The exemplary communications device 12 includes a data processing means comprising a processor (which may be referred to as a central processor unit or CPU, logic means, or controller) that is in communication with a machine-readable medium (computer-readable medium), input/output (I/O) devices, a network interface, and other interfaces. A computer-readable medium is any physical object that can store information in a form directly readable by a computer. Thus, magnetic, optical, and electrical storage devices are all contemplated, as well as any other method of storing information directly accessible to a computer. Hard disks, floppy disks, CD/DVD ROM drives, RAM chips, magnetic tapes, barcodes, punch cards, and the like are all examples of computer-readable media. The computer-readable medium includes an operating system, application programs.

An exemplary server 14 includes processor means, a computer-readable medium, network interface means, and I/O interface means. The computer-readable medium includes an operating system, application programs, and data related to the diagnostics files of said communications devices 12.

The network 16 can include a series of network nodes (such as, the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A method for providing diagnostics and troubleshooting tools for a communications device, the method comprising the steps of:
    defining data elements to be monitored, said data elements being associated with the operation of said communications device;
    associating the data elements with thresholds, said thresholds corresponding to the normal operation of said communications device;
    capturing diagnostics data related to said data elements to determine the operational status of said communications device;
    capturing abnormal events data outside said thresholds;
    capturing contemporaneous fault events data;
    storing said captured data and events on a computer readable medium; programming said communications device to report said captured data and events to a remote computing device for fault analysis and resolution; whereby said remote computing device receives data related to the nature of the fault and the data leading up to said fault, said data being useful for efficient fault diagnosis and troubleshooting and timely resolution of said fault; and
    wherein said communications device includes a support key, said support key being at least one key or at least one soft key associated with said data elements, such that activation of said at least one key or said at least one soft key causes at least one application program to initiate said capturing of data and at least one other action.

2. The method of claim 1 wherein said communications device includes a circular buffer associated with said support key and a circular event log data element for recording significant events related to said fault and preceding said activation of said support key, whereby said circular event log data provide the likely causes of said fault.

3. The method of claim 2 wherein said programming said activation of said support key transmits said data related to said support key and the corresponding circular event log data contemporaneously to a remote computing device for fault analysis and resolution.

4. The method of claim 2 wherein said circular event log recording runs in a production environment, and comprises data related to status metrics and error conditions, including but not limited to: memory status (periodical, high and low stats); timeouts (DNS, Registration, SIP Proxy); module restarts; module critical errors; MOS score of previous calls; and error codes/log numbers (minimal size of data); end user "support key" activation events, SIP Notify messages.

5. The method of claim 4 further comprising recording configuration file parsing errors and providing said parsing errors corresponding to invalid or ignored configuration statements for review, wherein said parsing errors are categorized depending on the type of error.

6. A system for fault diagnosis of a communications device, the system comprising:
    at least one diagnostic application program associated with said communications device;
    a remote computing device configured to receive diagnostic data from said communications device for further analysis and diagnosis of the reported fault;
    said communications device comprising a computer readable medium comprising said least one diagnostic application program comprising a first program code for defining data elements to be monitored, said data elements being associated with the operation of said communications device; a second program code for defining setting thresholds associated to said data elements, wherein said thresholds corresponding to the normal operation of said communications device; a third program code for capturing diagnostics data related to said defined data elements to determine the operational status of said communications device; and for capturing abnormal events data outside said thresholds and capturing contemporaneous fault events data;
    a fourth program code comprising instructions to send said captured data and events to a predetermined remote computing device for fault analysis and resolution; and
    wherein said communications device includes a support key, said support key being at least one key or at least one soft key associated with said data elements, such that activation of said at least one key or said at least one soft key causes at least one application program to initiate said capturing of data and at least one other action.

7. The system of claim 6 wherein communications device comprises a circular buffer associated with said support key and a circular event log data element for recording significant events related to said fault and preceding said activation of said support key, whereby said circular event log data provide the likely causes of said fault.

8. The system of claim 7 wherein activation of said support key transmits said data and the corresponding circular event log data contemporaneously to a remote computing device for fault analysis and resolution.

9. The system of claim 7 wherein said circular event log recording runs in a production environment, and comprises data related to status metrics and error conditions, including but not limited to: memory status (periodical, high and low stats); timeouts (DNS, Registration, SIP Proxy); module restarts; module critical errors; MOS score of previous calls; and error codes/log numbers (minimal size of data); end user "support key" activation events, SIP Notify messages.

10. The system of claim 9 further comprising recording configuration file parsing errors and providing said parsing errors corresponding to invalid or ignored configuration statements for review, wherein said parsing errors are categorized depending on the type of error.

11. The system of claim 6 wherein said communications device provides "boot-up" information via a web user interface (WebUI) and/or said device user interface, said boot-up data comprising data related to at least one of IP configuration data (DHCP or static), DNS lookup data, configuration files, SIP registration status, authentication status (LLDP, TLS; any timeouts or retries on server requests, such as DHCP/DNS/NTP), SIP trace (verbose, headers only), RTP packets (Rx/TX, Rx, Tx), WIRESHARK® information, memory usage, current syslog and level settings, crash log for abnormal reboots; register settings/stack trace, memory usage/free memory, CPU utilisation, local & server config files, and config file parsing results (invalid parameters).

12. The system of claim 6 wherein said remote computing device is a server comprising a service provider "support" portal that acts as a recipient storage device for said data elements, said server further comprising a syslog application program.

13. The system of claim 12 wherein said server initiates remote or support event triggers for acquiring config files, circular event files, and the crash file from said communications devices, or activating syslog.

14. The system of claim 6 wherein said diagnostics data comprises production syslog profiles comprising multiple sets of logging profiles capable of being executed in a live production environments.

\* \* \* \* \*